(12) United States Patent
Young et al.

(10) Patent No.: US 7,529,373 B2
(45) Date of Patent: May 5, 2009

(54) LASER AUTOCALIBRATION FOR QKD SYSTEMS

(75) Inventors: Jonathan Young, Newburyport, MA (US); Harry Vig, N. Billerica, MA (US); Michael J. Lagasse, Nahant, MA (US)

(73) Assignee: MagiQ Technologies, Inc., New York, NY (US)

( * ) Notice: Subject to any disclaimer, the term of this patent is extended or adjusted under 35 U.S.C. 154(b) by 318 days.

(21) Appl. No.: 10/589,419

(22) PCT Filed: Mar. 3, 2005

(86) PCT No.: PCT/US2005/006909

§ 371 (c)(1),
(2), (4) Date: Aug. 15, 2006

(87) PCT Pub. No.: WO2005/096540

PCT Pub. Date: Oct. 13, 2005

(65) Prior Publication Data

US 2007/0165862 A1     Jul. 19, 2007

Related U.S. Application Data

(60) Provisional application No. 60/554,687, filed on Mar. 19, 2004.

(51) Int. Cl.
*H04L 9/00* (2006.01)
*H04L 9/08* (2006.01)

(52) U.S. Cl. .................. 380/256; 380/278; 380/283; 713/150; 713/189; 713/501

(58) Field of Classification Search ............... 702/89, 702/106, 110; 257/53; 359/257, 277.22
See application file for complete search history.

(56) References Cited

U.S. PATENT DOCUMENTS 4,469,942 A    9/1984    Srivastava et al.

(Continued)

FOREIGN PATENT DOCUMENTS

WO    WO 9404889    3/1994

OTHER PUBLICATIONS

Bethune and Risk, "An Autocompensating Fiber-Optic Quantum Cryptography System Based on Polarization Splitting of Light", Mar. 2000, IEEE Journal of Quantum Electronics, vol. 36, No. 3, pp. 340-347.*

(Continued)

*Primary Examiner*—Syed A. Zia
*Assistant Examiner*—Michael R Vaughan
(74) *Attorney, Agent, or Firm*—Opticus IP Law PLLC (57) ABSTRACT

A method of autocalibrating a quantum key distribution (QKD) system (200) is disclosed. The QKD system includes a laser ((202) that generates photon signals in response to a laser gating signal (S0) from a controller (248). The method includes first performing a laser gate scan (304) to establish the optimum arrival time ($T_{MAX}$) of the laser gating signal corresponding to an optimum—e.g., a maximum number of photon counts ($N_{MAX}$)—from a single-photon detector (SPD) unit (216) in the QKD system when exchanging photon signals between encoding stations (Alice and Bob) of the QKD system. Once the optimal laser gating signal arrival time ($T_{MAX}$) is determined, the laser gate scan is terminated and a laser gate dither process (308) is initiated. The laser dither involves varying the arrival time (T) of the laser gating signal around the optimum value of the arrival time $T_{MAX}$. The laser gate dither provides minor adjustments to the laser gating signal arrival time to ensure that the SPD unit produces an optimum (e.g., maximum) number of photon counts.

19 Claims, 3 Drawing Sheets

U.S. PATENT DOCUMENTS

| | | | |
|---|---|---|---|
| 5,307,410 A | 4/1994 | Bennett | |
| 5,675,648 A | 10/1997 | Townsend | |
| 5,757,912 A | 5/1998 | Blow | |
| 6,104,986 A * | 8/2000 | Arevalo | 702/120 |
| 6,236,488 B1 | 5/2001 | Shimizu et al. | |
| 6,342,701 B1 | 1/2002 | Kash | |
| 6,445,478 B2 | 9/2002 | Shimizu et al. | |
| 6,462,825 B1 | 10/2002 | Wiebesick et al. | |
| 6,807,497 B2 * | 10/2004 | Kalem et al. | 702/72 |
| 7,102,121 B2 * | 9/2006 | Lagasse | 250/227.14 |
| 2003/0169880 A1 | 9/2003 | Nambu | |
| 2004/0057526 A1 | 3/2004 | Debuisschert | |
| 2004/0062396 A1 | 4/2004 | Debuisschert | |
| 2006/0239460 A1 * | 10/2006 | Young | 380/256 |
| 2006/0239463 A1 * | 10/2006 | Young | 380/278 |

OTHER PUBLICATIONS

Rana, Ram, and Haus, "Quantum Noise of Actively Mode-Locked Lasers With Dispersion and Amplitude/Phase Modulation", Jan. 2004, IEEE Journal of Quantum Electronics, vol. 40, No. 1, pp. 41-56.*

Stucki et al, "Photon counting for quantum key distribution with Peltier cooled InGaAs/InP", http://arxiv.org quant-ph/0106007v1, pp. 1-18, Jun. 1, 2001.

* cited by examiner

LASER AUTOCALIBRATION FOR QKD SYSTEMS

CLAIM OF PRIORITY

The present invention claims priority from U.S. Provisional Patent Application Ser. No. 60/554,687, filed on Mar. 19, 2004.

TECHNICAL FIELD OF THE INVENTION

The present invention relates to and has industrial utility in the field of quantum cryptography, and in particular relates to and has industrial utility in connection with apparatus and methods of autocalibrating quantum key distribution (QKD) system to maintain optimal system performance.

BACKGROUND ART

Quantum key distribution (QKD) involves establishing a key between a sender ("Alice") and a receiver ("Bob") by using weak (e.g., 0.1 photon on average) optical signals ("photon signals") transmitted over a "quantum channel." The security of the key distribution is based on the quantum mechanical principle that any measurement of a quantum system in an unknown state will modify its state. As a consequence, an eavesdropper ("Eve") that attempts to intercept or otherwise measure the photon signals will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). A specific QKD system is described in U.S. Pat. No. 5,307,410 to Bennett (the '410 patent).

The above-mentioned publications each describe a so-called "one-way" QKD system wherein Alice randomly encodes the polarization or phase of the photon signals, and Bob randomly measures the polarization or phase of the photon signals. The one-way system described in the '410 patent is based on two optical fiber Mach-Zehnder interferometers. Respective parts of the interferometric system are accessible by Alice and Bob so that each can control the phase of the interferometer. The signals (pulses) sent from Alice to Bob are time-multiplexed and follow different paths. As a consequence, the interferometers need to be actively stabilized to within a few tens of nanoseconds during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

When operating a commercial QKD system, multiple variables need to be aligned in time and then maintained aligned for optimal system performance. For example, in a commercial QKD system one or more single-photon detectors (SPDs) are gated with a gating signal from a controller to synchronize the detection of optical pulses with expected pulse arrival times. However, once the system is set up, the timing drifts due to various systemic and environmental factors and the photon count can drop. This leads to a reduction in the transmission rate of the system, and also to an increase in the bit-error rate—i.e., to less-than-optimal system performance.

While laboratory and prototype QKD systems can be adjusted to account for system drifts under very controlled and artificial conditions, making the necessary adjustments for a commercial QKD system in the field is a far more daunting endeavor. And, unlike with a laboratory or prototype QKD system, end-users of commercial QKD systems have an expectation that their QKD system will automatically run in an optimal state with minimal or no operator intervention.

SUMMARY OF THE INVENTION

A first aspect of the invention is a method of autocalibrating a QKD system having two encoding stations, where one of the encoding stations includes a laser and a controller. The method includes performing a laser gate scan by sending a laser gating signal S0 from the controller to the laser and varying the arrival time T of the signal over a first select range R1. The method also includes determining an optimal timing $T_{MAX}$ for the laser gating signal that corresponds to a maximum number of photon counts $N_{MAX}$ from the single-photon detector (SPD) unit when exchanging photon signals between encoding stations of the QKD system. The method further includes performing laser gating signal dithering by varying the arrival time T over a second select range R2 surrounding $T_{MAX}$ to maintain the photon count at an optimum value, such as the maximum value $N_{MAX}$.

A second aspect of the invention is method of exchanging a key in a quantum key distribution (QKD) system having two encoding stations, and a laser coupled to a controller in one of the encoding stations. The method includes using a laser to generate photon signals and exchanging the photon signals between the encoding stations in the QKD system. The method also includes performing a first laser gate scan. The first laser gate scan is accomplished by sending laser gating signals S0 from the controller to the laser over a range of laser gating signal arrival times T to establish a first optimal arrival time $T_{MAX}$ for the laser gating signal corresponding to a first maximum number of photon counts $N_{MAX}$ from the detector. The method also includes terminating the first laser gate scan when the first $T_{MAX}$ is established, and then performing a first laser gate dither. The first laser gate dither is accomplished by the controller altering the arrival time T of the (optimum) laser gating signal over a range of arrival times R2 about the first $T_{MAX}$ to maintain either the maximum number of photon counts $N_{MAX}$ or a different maximum number of photon counts $N'_{MAX}$ over the range R2.

A third aspect of the invention is a continuation of the method of the second aspect of the invention described immediately above, wherein performing the laser gate dither results in a new optimal arrival time $T'_{MAX}$. The method of the third aspect of the invention includes terminating the performing of a laser gate dither, performing a second laser gate scan, terminating the second laser gate scan, and then performing a second laser gate dither to automatically reestablish optimal system performance.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention relates to methods of performing autocalibration of a QKD system to maintain optimal system performance. In particular, the present invention involves performing laser gating signal scanning to determine the optimal laser gating signal position (timing), as well as performing laser gating signal timing dithering in order to maintain the optimal laser gating signal size (i.e., width) and position during the QKD system's operation. This results in optimal photon signal detection (i.e., the greatest number of photon signal counts) in the QKD system, which generally corresponds to the optimal operation of the QKD system as a whole. The invention is preferably carried out by a programmed controller so that the system can be maintained as operating in an ideal or near-ideal state without operator intervention. Such autocalibration is essential in a commercially viable QKD system.

The invention is applicable to one-way, two-way, ring topology and n-way QKD systems that use either polarization encoding or phase encoding, and that use one or more single-photon detectors. The invention is described below in connection with an example embodiment of a two-way QKD system using phase-encoding and a single-photon detector unit having two detectors. This choice of QKD system is merely for the sake of illustrating the methods of the present invention, and is no way intended as limiting.

Also, in the description below, a "gating signal" is a signal that activates the element to which the signal is sent, wherein the activation of the element corresponds to the duration (width W) of the signal. Thus, the laser gating signal activates the laser for the duration (i.e., width) of the laser gating signal, wherein activation starts at the leading edge of the pulse and ends at the trailing edge of the pulse. In the case of the pulsed laser, the optical pulse is emitted from the laser at some point during the width of the laser gating signal (say, at the rising edge of the gating signal), and the resulting optical pulse may have an optical pulse width smaller than that of the width of the laser gating signal.

Also, in the discussion below, the laser generates optical pulses used to exchange keys between the two encoding stations of the QKD system. In a preferred embodiment, these pulses are attenuated after they leave the laser to form the quantum pulses (referred to below as "photon signals") that have, on average, one photon or less. Thus, in the description below and in the claims, the phrase "photon signals generated by the laser" and similar phrases are understood to include the case where the laser generates relatively strong optical pulses that are later attenuated (e.g., via a variable attenuator) to form the photon signals, as well as the case wherein the laser is a single-photon source or is otherwise included in a single-photon source.

QKD System Embodiment

Figure 1:
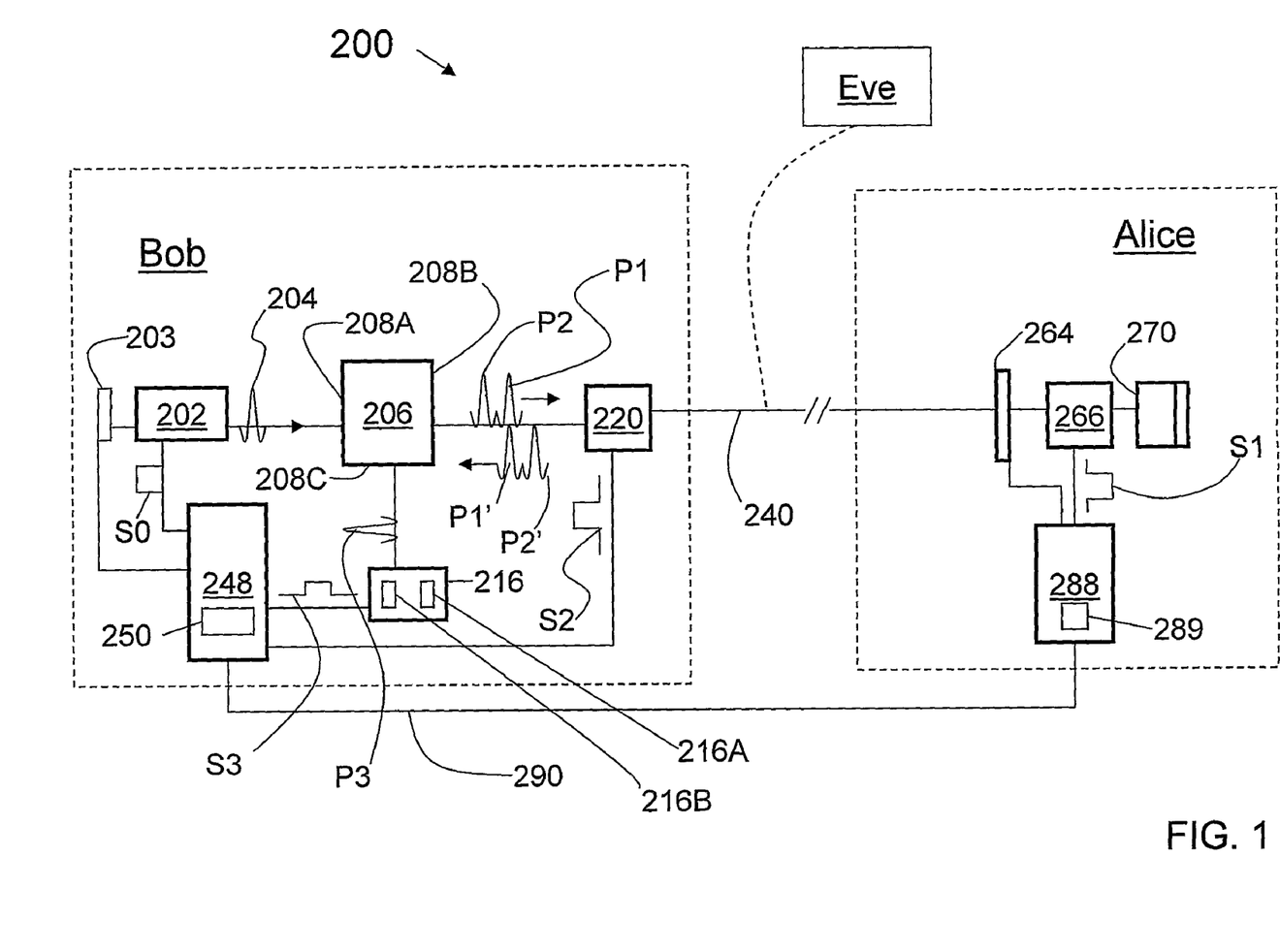
FIG. 1 is an example embodiment of a two-way QKD system suitable for implementing the method of the present invention.

FIG. 1 is a schematic diagram of an example embodiment of a folded QKD system 200 to which the methods of the present invention are aptly suited. System 200 includes two key encoding ("encoding") stations: a transmitting/receiving station Bob and a reflecting station Alice, referred to hereinafter simply as "Bob" and "Alice."

Bob

With continuing reference to FIG. 1, Bob includes a laser 202 that emits optical pulses 204. In an example embodiment, laser 202 is a laser diode and includes a back facet monitor (BFM) 203. Laser 202 is coupled to a time-multiplexing/demultiplexing optical system 206 having an input end 208A, an input/output end 208B, and a detector output end 208C. Optical system 206 receives input pulses 204 at input end 208A, splits each pulse into two time-multiplexed orthogonally polarized pulses P1 and P2 and outputs them at input/output end 208B. Likewise, optical system 206 also receives optical pulses at input/output end 208B, as described below.

A single-photon detector (SPD) unit 216 is coupled to optical system 206 at detector output end 208C. In an example embodiment, SPD unit 216 includes two SPDs 216A and 216B. A phase modulator (PM) 220 is coupled (e.g., by an optical fiber) to optical system input/output end 208B. An optical fiber 240 connects Bob to Alice at PM 220.

Bob also includes a controller 248 operatively (e.g., electrically) coupled to laser 202, BFM 203, SPD unit 216, and PM 220 to control the operation of these elements, as described below. In an example embodiment, controller 248 includes a programmable computer capable of performing instructions (e.g., "software") stored on a computer-readable medium 250. In an example embodiment, the instructions stored on the computer-readable medium 250 include methods according to the present invention as described below.

Alice

Alice includes a variable optical attenuator (VOA) 264 connected to optical fiber 240. A phase modulator (PM) 266 is arranged downstream of and is optically coupled to VOA 264. A Faraday mirror 270 is arranged downstream of and is optically coupled to PM 266.

Alice also includes a controller 288 operatively (e.g., electrically) coupled to PM 266 and VOA 264. In an example embodiment, controller 288 includes a programmable computer capable of performing instructions (e.g., "software") stored on a computer-readable medium 289. In an example embodiment, the instructions stored on the computer-readable medium 289 include methods according to the present invention as described below.

Controllers 248 and 288 are linked (e.g., electrically or optically) via synchronization link 290 to synchronize the operation of Alice and Bob. In particular, the operation of the laser 202, phase modulators 220 and 266, and SPD unit 216 are controlled and coordinated by controllers 248 and 288 relative to the launched optical pulse 204 using gating signals S0, S2, S3 and S1, respectively, when exchanging a quantum key between Alice and Bob. Thus, in an example embodiment, controllers 248 and 288 are considered as constituting a single controller for the QKD system.

QKD System Operation

With continuing reference to FIG. 1, in the operation of system 200, a laser gating signal S0 is sent by controller 248 to laser 202 to generate optical pulse 204. Optical pulse 204 is then divided into two separate pulses P1 and P2 by time-multiplexing/demultiplexing optical system 206. In an example embodiment, pulses P1 and P2 are relatively weak pulses, but can be strong pulses attenuated later at Alice prior to returning to Bob. The optical pulses P1 and P2 are passed out of optical system input/output end 208B to PM 220, which is gated to allow the pulses to pass therethrough unmodulated. Pulses P1 and P2 then pass to Alice over optical fiber 240. Pulses P1 and P2 continue to VOA 264, which can attenuate the pulses if necessary. The pulses then pass through PM 266 and are reflected by Faraday mirror 270, and then pass back through PM 266 a second time.

During one of the passes of pulses P1 and P2 through PM 266, the PM modulates one of the pulses—say, pulse P1—to form a phase-modulated pulse P1'. This is achieved by controller 288 sending a well-timed gating signal S1 that activates PM 266 for the short period of time (i.e., less than the time-separation between the pulses) when pulse P1 passes through PM 266. Pulses P1 and P2 then pass back through VOA 264, which can attenuate the pulses, if necessary, to ensure that photon signals (i.e., optical pulses having an average number of photons of one or less) are exchanged between Bob and Alice.

The pulses then pass back to Bob as photon signals and pass to PM 220. PM 220 is then directed to randomly modulate one of the pulses—say the remaining unmodulated pulse P2—with one of the select phase modulation values to form a modulated pulse P2'. This is achieved by controller 248 providing a well-time gating signal S2 to PM 220 that activates the phase modulator during the short time period within which pulse P2 passes through PM 220.

Now-modulated pulses P1' and P2' continue on to optical system 206. Optical system 206 combines the pulses to form a combined pulse P3, which is directed out of detector output end 208C to SPD unit 216. SPD unit 216 receives combined pulse P3 and outputs a signal to controller 248 that corresponds to the relative phases imparted to pulses P1 and P2 by PM's 266 and 206, respectively. In an example embodiment, one of detectors 216A and 216B receives the interfered pulse P3, depending on whether the interference is constructive or destructive. If the imparted phase is neither constructive nor destructive, pulse P3 winds up in either detector with equal probability.

Once a desired number of photon signals are exchanged, the key is derived using standard techniques—for example, by Alice and Bob publicly comparing the basis of their measurements and only keeping the measurements (bits) corresponding to the same measurement basis. This forms the sifted key. They then choose a subset of the remaining bits to test for the presence of an eavesdropper Eve and then discard these bits. The act of eavesdropping on optical fiber 240 by Eve intercepting or otherwise attempting to measure the weak optical pulses being transmitted between Bob and Alice will necessarily introduce errors in the key due to the quantum nature of the photons being exchanged. If there are no errors in the sifted key due to the presence of an eavesdropper Eve, then the transmission is considered secure, and the quantum key is established.

Methods of Maintaining Optimal System Operation

Figure 2:
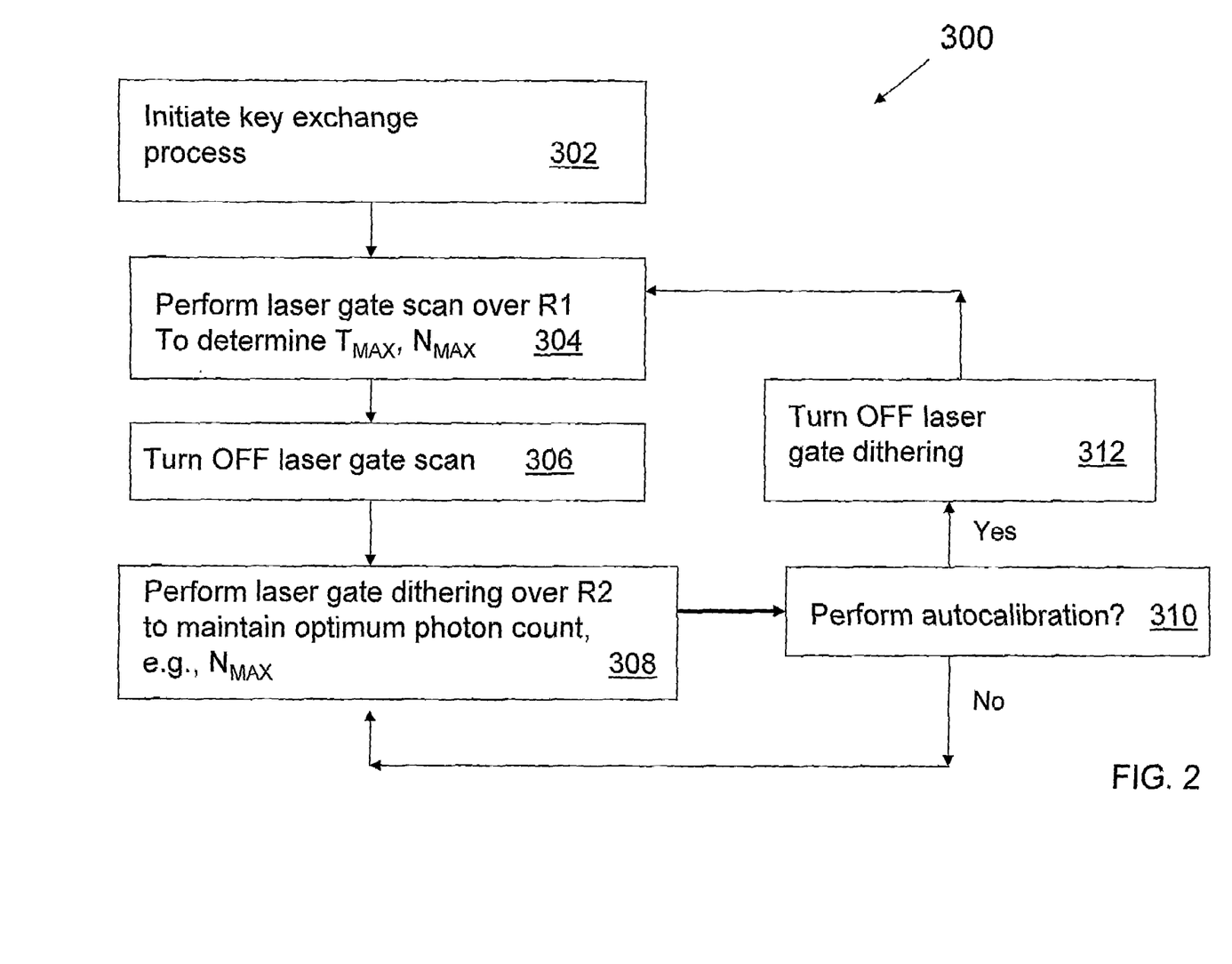
FIG. 2 is a flow diagram illustrating the laser autocalibration method, which includes scanning and dithering of the laser gating signal to optimize the photon count while exchanging photon signals.

FIG. 2 is a flow diagram 300 of the method of maintaining optimal system operation of a QKD system such as QKD system 200 of FIG. 1 The method involves performing both a laser gate scan and a laser gate dither in the manner described below.

In 302, the key exchange process is initiated by controller 248 sending laser gating signal S0 to laser 202 to emit optical pulses 204 so that time-multiplexed optical pulses P1 and P2 can be sent from Bob to Alice. This process includes controller 288 instructing PM 266 via gating signal S1 to phase modulate one of the pulses, having the pulses travel back to Bob, modulating the remaining pulse, combining the modulated pulses, and detecting the combined pulse P3 in SPD unit 216, as described above.

In 304, a laser gate scan is performed. This involves varying the timing (e.g., the arrival time T) of laser gating signal S0 over a selected range R1 of timing values to establish the optimal gate timing (arrival time) $T_{MAX}$ that yields an optimum photon count. In an example embodiment, the optimum photon count is the maximum number of photon counts $N_{MAX}$ of exchanged photon signals detected by SPD unit 216. In another example embodiment, the optimum photon count is the maximum of the total number of photon counts NT taken over a given interval to the number of "double clicks" from SPD unit 216 over the same interval. Double-clicks are caused by, for example, dark noise or from two photons being detected in two separate SPDs in SPD unit 216.

It is worth noting that in the case where SPD unit 216 includes two detectors 216A and 216B, it is typically a good presumption that drifts (e.g., thermal drifts) occurring in the SPD unit affect SPDs 216A and 216B to essentially the same extent, so that the two SPD drift together.

Figure 3:
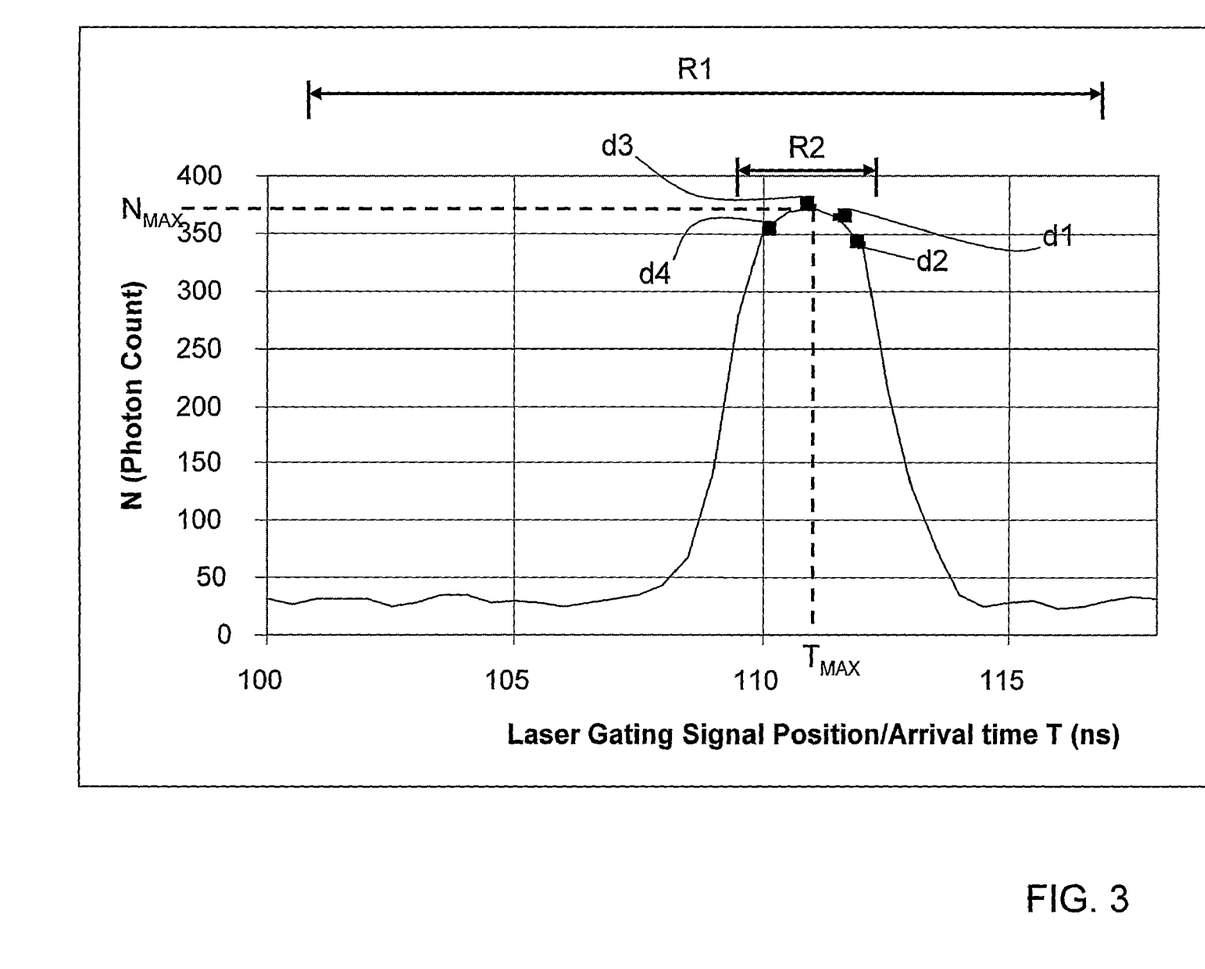
FIG. 3 is an example plot of a single-photon laser gate scan for a QKD system such as that shown in FIG. 1, wherein the Y-axis is the number of photon counts N in a regular time interval from the SPD unit, and the X-axis is the timing (arrival time) of the laser gating signal.

FIG. 3 is an example plot of the results of a laser gate scan in the example embodiment where the maximum number of photon counts N is measured as the optimum photon count. In the plot of FIG. 3, the Y-axis is the number N of photon counts obtained by SPD unit 216 associated with a given laser gate scan time T. The X-axis represents the relative timing (e.g., arrival time T) of the laser gating signal S0 at laser 202, which is varied to achieve maximum number of photon counts $N_{MAX}$. In the context of the present invention, the maximum number of photon counts $N_{MAX}$ corresponds to optimal system performance because it corresponds to the highest data transmission rates and highest photon signal sensitivity level vs. timing, with no increase in dark current counts. Likewise, in an example embodiment of the present invention, an optimal photon signal is one that optimizes the ratio of photon pulses to dark event pulses, while maintaining a smooth detector response that allows for laser gate dithering, as described below.

The curve in FIG. 3 is obtained by incrementing the arrival time T of the laser gating signal S0 over a select range R1 of timing values T (X-axis). In an example embodiment, the arrival time T corresponds to the position of the leading edge of the laser gating signal relative to a reference, e.g., a clock reference time provided by controller 248.

Once $T_{MAX}$ and $N_{MAX}$ are determined, then the process proceeds to 306, wherein the laser gate scan is terminated (i.e. is turned OFF).

In 308, laser gate dithering is performed. This involves repeatedly changing the timing (e.g., arrival time T) and/or pulse width W of the laser gating signal S0 by small amounts within a select timing range R2 around the maximum (optimum) arrival time $T_{MAX}$ (i.e., the laser gating signal is "dithered"). If necessary, the arrival time T is shifted from its original optimal value $T_{MAX}$ to a new optimal value $T'_{MAX}$ so that the photon count N is maintained at the maximum value $N_{MAX}$ (or alternatively, to a new maximum photon count $N'_{MAX}$). Note that select range R2 is smaller than R1 and is selected to surround a relatively small range about $T_{MAX}$. Also note that as discussed above, optional laser gate width scanning and dithering can be performed.

In an example embodiment, the timing range R2 is selected to be small enough to keep a security attacker (e.g., Eve) from leading the timing off to an undesirable location, yet large enough to allow for the dithering process to be successful, i.e., keep the photon count N at a maximum value $N_{MAX}$.

With reference again to FIG. 3, four data points d1, d2, d3 and d4 on the curve are highlighted for the sake of illustration. Assume the data point d1 is measured first, then the data point d2 associated with a greater arrival time T is measured. Since the number of photon counts associated with d2 is less than that associated with d1, the arrival time T of the laser gating signal S0 is decreased. The number of photon counts for the laser gating signal position associated with data point d1 is re-measured. Since the number of photon counts N associated with the second data point at d1 is higher than that associated with data point d2, the arrival time T is further decreased and the photons count is measured. The result is data point d3, which has a higher photon count than for data point d1. The arrival time T is thus decreased again, yield the lower photon count associated with a data point d4. Since this measurement is less than that for d3, the arrival time T of the laser gating signal S0 is increased, but not so much that it returns to the value associated with data point d2.

In this manner, the laser gating signal timing is varied back and forth ("dithered") until it converges on the maximum (or near-maximum) number of photon counts. Thus, during normal operation of SPD unit 216, the laser gate dither process keeps the single-photon sensitivity high. In an example embodiment, laser gate dithering is performed periodically, for example every second. In an example embodiment, this rate is proportional to the number of single-photon counts received.

In 310, the choice of performing an autocalibration of the laser gating signal S0 by initiating another laser gate scan is presented. If such autocalibration is desired or otherwise deemed necessary, then the method proceeds to 312. In 312, the laser gate dither is turned OFF and the process returns to the laser gate scan of 304 to perform an updated calibration of the laser gate timing and/or laser gating signal width to find a new optimal arrival time $T_{MAX}$ and/or optimal pulse width $W_{MAX}$. This updated calibration may need to be performed for a variety of reasons, such as a detected change in the environment or because of normal system drifts.

In an example embodiment, autocalibration of the QKD system is performed when any of the following conditions occur: a) a change in photon count levels outside of statistical limits, b) ambient temperature changes greater than a predetermined amount such as 0.5° C. occur, c) an optical path has changed configuration, as through a switching network element, different from event a), as in a message of a pending event will be sent before the change in photon count levels, d) on a daily schedule due to known daily temperature cycling, and e) on a fixed time basis, such as every hour, whether needed or not.

The need to turn OFF the laser gate dither prior to performing the laser gate scan arises because the two processes can interfere with one another. Specifically, while the laser gate scan tries to increment the timing or width of the laser gating signal in a smooth (i.e., incremental) fashion, the laser gate dither tries to adjust the variable back and forth over small increments in order to stay on the maximum number of photon counts. Consequently, the two competing processes can produce spurious results. Thus, following a scan and update of the laser gating signal parameters during the laser gate scan of 304, the laser gate dither is automatically (or alternatively, is manually) turned back ON.

If there is no desire or need to perform the autocalibration, then the method remains in the laser gate dither process of 308, which as mentioned above is repeated, e.g., every second or so. The periodic laser gate dither process generally results in slight changes of the value of $T_{MAX}$ in order to maintain the photon count at $N_{MAX}$, or alternatively to maintain the photon count at new maximum values $N'_{MAX}$, $N''_{MAX}$, etc.

For the sake of clarity and simplicity, in the present invention, "maximum photon counts" can mean $N_{MAX}$ or $N'_{MAX}$ or $N''_{MAX}$, etc. Likewise, the "optimal arrival time $T_{MAX}$" can change, and so in the present invention can mean $T_{MAX}$, $T'_{MAX}$ and $T''_{MAX}$, etc. Likewise, "optimum photon count" is used herein to refer generally to a figure of merit that is based on counting (detecting) photons during the QKD process.

In an example embodiment, one or more of the methods of the present invention is/are embodied in at least one of computer readable medium 250 and 289 and is executed by at least one of controllers 248 and 288.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A method of autocalibrating a quantum key distribution (QKD) system having first and second QKD encoding stations, a laser and a single-photon detector (SPD) unit, comprising:
   a) performing laser gate scanning by:
      i) sending laser gating signals to the laser to cause the laser to generate photon signals;
      ii) varying an arrival time T of the laser gating signals over a first range R1 to vary times at which the photon signals are generated;
      iii) exchanging the photons signals between the first and second QKD encoding stations and performing first and second encodings of the photon signals at the first and second QKD stations, respectively;
      iv) detecting a combination of the first and second encoded photon signals at the SPD unit in one of the first and second QKD encoding stations so as to generate photon counts and determining an optimal arrival time $T_{MAX}$ of the laser gating signals that corresponds to a first optimum number of photon counts; and
   b) performing laser gate dithering by varying the arrival time T of the laser gating signals over a second range R2 surrounding $T_{MAX}$ to maintain either the first optimum number of photon counts or a second optimum number of photon counts.

2. The method of claim 1, wherein at least one of the first and second optimum number of photon counts is/are either a maximum number of detected photons $N_{MAX}$, or a maximum of the total number of photon counts N detected over a time interval divided by a number of double-clicks from the SPD unit over the time interval.

3. The method of claim 1, including:
   terminating the laser gate dithering and performing another laser gate scan.

4. The method of claim 1, wherein the photon signals are phase-encoded by a first phase modulator in the first QKD encoding station and a second phase modulator in the second QKD encoding station.

5. The method of claim 1, further including:
   encoding a first photon signal in the first QKD encoding station;
   encoding a second photon signal in the second QKD encoding station; and interfering the first and second encoded photon signals to form the combination of the first and second encoded photon signals.

6. A computer-readable medium having instructions embodied therein that, when executed by a computer in a quantum key distribution (QKD) system having first and second QKD encoding stations and a laser, cause the computer to perform the following method of actively autocalibrating the QKD system:
   a) performing laser gate scanning by:
      i) sending laser gating signals to the laser to cause the laser to generate photon signals;
      ii) varying an arrival time T of the laser gating signals over a first range R1 to vary times at which the photon signals are generated;
      iii) exchanging the photons signals between the first and second QKD encoding stations and encoding the photon signals at the first and second QKD encoding stations, respectively;
      iv) detecting a combination of the first and second encoded photon signals at the SPD unit in one of the QKD encoding stations to generate photon counts and determining an optimal arrival time $T_{MAX}$ of the laser gating signals that corresponds to an optimum number of photon counts from the SPD unit; and
   b) performing laser gate dithering by varying the arrival time T of the laser gating signals over a second range R2 surrounding TMAX to maintain the optimum number of photon counts.

7. The computer-readable medium of claim 6, wherein the optimum number of photon counts is either:
   a maximum number of photons $N_{MAX}$, or a maximum of the total number of photon counts N over a time interval divided by a number of double-clicks from the SPD unit over the time interval.

8. A method of exchanging photon signals in a quantum key distribution (QKD) system having a laser and a single-photon detector (SPD) unit both operably coupled to a controller, comprising:
   encoding and exchanging the photon signals between first and second QKD encoding stations in the QKD system, where the photon signals are generated by the laser in response to laser gating signals;
   performing a first laser gate scan by sending the laser gating signals from the controller to the laser over a range R1 of laser gating signal arrival times T;
   establishing from the first laser gate scan a first optimal arrival time $T_{MAX}$ for the laser gating signal corresponding to a first maximum number of photon counts $N_{MAX}$ from detecting the encoded photon signals at the SPD unit;
   terminating the first laser gate scan when the first optimal arrive time $T_{MAX}$ is established; and
   performing a first laser gate dither by altering the arrival time T over a range of arrival times R2 about the first optimal arrival time $T_{MAX}$ to maintain either the first maximum number of photon counts $N_{MAX}$ or a different maximum number of photon counts $N'_{MAX}$ over the range R2.

9. The method of claim 8, wherein performing the first laser gate dither results in a new optimal arrival time $T_{MAX}$.

10. The method of claim 8, further including:
    terminating the performing of the first laser gate dither; and
    performing a second laser gate scan;
    terminating the second laser gate scan; and
    performing a second laser gate dither.

11. The method of claim 8, further including terminating and repeating the first laser gate dither periodically so as to perform a series of laser gate dithers.

12. A computer-readable medium having instructions embodied therein that, when executed by a computer in a quantum key distribution (QKD) system, cause the computer to perform the following method of actively autocalibrating the QKD system, the method comprising:
    sending photon signals between first and second QKD encoding stations in the QKD system, wherein the photon signals are generated by a laser in response to laser gating signals having associated arrival times T at the laser and respectively encoded by the first and second QKD encoding stations to form encoded photon signals;
    performing a first laser gate scan by varying the arrival time T over a first range of arrival times R1 to establish a first optimal arrival time $T_{MAX}$ corresponding to a first maximum number of photon counts $N_{MAX}$ from a detector unit in one of the QKD encoding stations and that is configured to detect a combination of the encoded photon signals;
    terminating the first laser gate scan when the first $T_{MAX}$ is established; and
    performing a first laser gate dither by altering the arrival time T over a second range of arrival times R2<R1 about the first $T_{MAX}$ to maintain either a) the first maximum number of photon counts $N_{MAX}$, or b) a different maximum number of photon counts $N'_{MAX}$ over the second range R2.

13. A method of autocalibrating a quantum key distribution (QKD) system having a laser, a single-photon detector (SPD) unit and controller operably coupled to the laser and the SPD unit, comprising:
    generating photon signals with the laser by activating the laser with laser gating signals sent from the controller, the laser gating signals having an associated laser gating signal timing T;
    sending the photon signals between first and second QKD encoding stations in the QKD system so as to encode the photon signals;
    performing a first laser gate scan to determine an optimum arrival time $T_{MAX}$ for the laser gating signals to arrive at the laser by obtaining a first optimum number of photon counts of combined encoded photon signals detected at the SPD unit;
    terminating the first laser gate scan when $T_{MAX}$ is determined; and
    periodically dithering the laser gating signal arrival time about $T_{MAX}$ to maintain either the first optimum number of photon counts or a second optimum number of photon counts.

14. The method of claim 13, further including:
    terminating the laser gating signal dithering; and
    performing another laser gate scan.

15. The method of claim 13, wherein at least one of the first and second optimum number of photon counts is a maximum number of photon counts.

16. The method of claim 13, including generating the photon signals and detecting the encoded photon signals in the same QKD encoding station.

17. A method of actively autocalibrating a quantum key distribution (QKD) system having first and second QKD encoding stations, and a laser coupled to a controller in one of the encoding stations, the method comprising:
    generating photon signals from the laser by sending laser gating signals from the controller to the laser;

exchanging the photons signals between the first and second QKD encoding stations and performing first and second encodings of the photon signals at the first and second encoding stations, respectively, thereby forming encoded photon signals;

establishing an optimum arrival time of the laser gating signals that corresponds to a first optimum number of photon counts from a single-photon detector (SPD) unit in one of the QKD encoding stations;

terminating the laser gate scan; and varying the arrival time of the laser gating signals around the optimal arrival time in order to provide minor adjustments to the arrival time that lead to the SPD unit yielding either the first optimum number of photon counts, or a second optimum number of photon counts.

18. The method of claim 17, wherein at least one of the first and second optimum number of photon counts is either a maximum number of photon counts, or a maximum of a total number of photon counts for a given interval divided by a number of double-clicks in the same interval.

19. The method of claim 17, including generating the photon signals and detecting the encoded photon signals in the same QKD encoding station.

* * * * *